United States Patent  
Gunthorpe et al.

(10) Patent No.: US 7,843,962 B2  
(45) Date of Patent: Nov. 30, 2010

(54) METHOD TO EXTEND THE PHYSICAL REACH OF AN INFINIBAND NETWORK

(75) Inventors: Jason Gary Gunthorpe, Edmonton (CA); David Thomas Southwell, Sherwood Park (CA); Christopher Jeske, New Sarepta (CA)

(73) Assignee: Obsidian Research Corporation, Edmonton (CA)

( * ) Notice: Subject to any disclaimer, the term of this patent is extended or adjusted under 35 U.S.C. 154(b) by 858 days.

(21) Appl. No.: 11/457,981

(22) Filed: Jul. 17, 2006

(65) Prior Publication Data

US 2007/0014308 A1 Jan. 18, 2007

Related U.S. Application Data

(60) Provisional application No. 60/595,576, filed on Jul. 17, 2005.

(51) Int. Cl.
 *H04J 3/16* (2006.01)
(52) U.S. Cl. ..................... 370/466; 370/469
(58) Field of Classification Search .................. None
 See application file for complete search history.

(56) References Cited

U.S. PATENT DOCUMENTS

| | | | |
|---|---|---|---|
| 5,588,003 A * | 12/1996 | Ohba et al. ............... 370/468 |
| 6,799,202 B1 | 9/2004 | Hankinson et al. |
| 6,898,752 B2 * | 5/2005 | Tucker ..................... 714/752 |
| 6,904,507 B2 * | 6/2005 | Gil ........................... 711/170 |
| 7,006,527 B1 * | 2/2006 | O'Connor ................ 370/466 |
| 7,020,729 B2 | 3/2006 | Taborek, Sr. et al. |
| 7,039,057 B1 | 5/2006 | Acharya et al. |
| 7,051,304 B2 | 5/2006 | Bozkaya et al. |
| 2001/0043564 A1 * | 11/2001 | Bloch et al. ............. 370/230 |
| 2003/0041146 A1 * | 2/2003 | Davis et al. ............. 709/227 |
| 2003/0118053 A1 | 6/2003 | Edsall et al. |
| 2003/0152182 A1 * | 8/2003 | Pai et al. ................. 375/372 |
| 2004/0024903 A1 | 2/2004 | Costatino et al. |
| 2004/0114924 A1 * | 6/2004 | Holness et al. ........... 398/33 |
| 2004/0151203 A1 * | 8/2004 | Gulati et al. ............. 370/465 |
| 2004/0213220 A1 * | 10/2004 | Davis ....................... 370/389 |
| 2005/0053064 A1 | 3/2005 | Wang |

(Continued)

FOREIGN PATENT DOCUMENTS

CA 2542407 A1 5/2005

(Continued)

OTHER PUBLICATIONS

CommsDesign, "QDR2 SRAM", Jul. 6, 2004, EE Times, p. 1.*

(Continued)

*Primary Examiner*—Chirag G Shah
*Assistant Examiner*—Steve Young
(74) *Attorney, Agent, or Firm*—Sean W Goodwin (57) ABSTRACT

A system for an apparatus for extending the physical reach of an InfiniBand network. Methods and apparatus can connect an InfiniBand network to a long distance connection (e.g. WAN) while maintaining full 10 Gbit InfiniBand speeds and retaining the semantics specified by the InfiniBand Architecture (IBTA). A system can include an InfiniBand interface, a management block, packet routing, encapsulation/de-encapsulation, bulk memory buffer, and WAN interface, logic and circuits. The invention is applicable to efficiently moving large amounts of data over large distances using a single transport stream.

43 Claims, 6 Drawing Sheets

U.S. PATENT DOCUMENTS

2006/0268943 A1 * 11/2006 DeCusatis et al. .......... 370/539

FOREIGN PATENT DOCUMENTS

| WO | WO2004/025485 A2 | 3/2004 |
| WO | WO2004/025485 A3 | 3/2004 |

OTHER PUBLICATIONS

Factsheets, Infiniband-SI19IB20 Link Protocol Engine, Copyrights (c) 2002-2003 Silicon Interfaces Private Limited. www.siliconcores.com and www.siliconinterfaces.com.

Obsidian Brochure: Hank Dardy, Chief Scientist for Advanced Computation Naval Research Information Grid. "Scaling the Global Information Grid", Nov. 11, 2005.

ByteandSwitch, Obsidian Extends InfiniBand. Nov. 9, 10 and 11, 2005. www.byteandswitch.com/document. asp?doc_id+84110 &WT.svl=news1_1.

* cited by examiner

Fig. 3B ered as a conduit that carries bits, it is clear that a single piece of long fiber may contain many megabits of data that is in transit. For instance, if the speed of light in a particular fiber
METHOD TO EXTEND THE PHYSICAL REACH OF AN INFINIBAND NETWORK

CROSS REFERENCE TO RELATED APPLICATIONS

This application is a regular U.S. patent application claiming priority of U.S. Provisional Patent application Ser. No. 60/595,576 filed Jul. 17, 2005, the entirety of which is incorporated herein by reference.

FIELD OF THE INVENTION

The present invention relates to an apparatus for extending the physical reach of an InfiniBand network beyond that currently possible within the InfiniBand Architecture and in particular allows InfiniBand packets to be carried over networks that are not themselves conformant to the InfiniBand Architecture. This allows InfiniBand traffic to share a physical network with other standard protocols such as the Internet Protocol version 6 (IPv6) or Asynchronous Transfer Mode (ATM) cells. Further, due to a very large flow control buffer in the apparatus, coupled with the use of a flow control credit scheme to prevent buffer overflow, the invention allows a large amount of data to be in transit within the Wide Area Network (WAN) while still ensuring that no packets will be lost due to inadequate buffering resources at the receiver. In order to help ensure that no packets are dropped within the WAN the apparatus may also include a number of Quality of Service (QOS) functions that serve to limit the injection rate of data into the WAN in response to back pressure. The invention may also allow packets to be routed in such a way as to allow more than one apparatus to be connected to the WAN thus enabling an InfiniBand network to be extended to more than 2 physical locations using a minimum number of apparatus. A processor contained within the apparatus may handle management functions, such as the InfiniBand subnet management agent and device management.

BACKGROUND OF THE INVENTION

It is known that 10 Gbit InfiniBand is only capable of reaching approximately 10 km due to the limit within the InfiniBand Architecture of at most 128 KiB of granted credits per virtual lane (VL). This restriction places an upper limit on the amount of data that can be in transit at once, since a standard InfiniBand transmitter will not transmit without an available credit. Further, it is known that limiting the amount of data that can be in transit to less than the bandwidth latency product of a network path will directly limit the maximum data transfer rate that can be attained.

For instance, a 10 Gbit InfiniBand link with a round trip latency of 130 microseconds has a bandwidth latency product of 128 KiB, which is the maximum amount of credits that can be granted for a single VL within an InfiniBand link.

Typically an InfiniBand link will have more than 1 ingress and egress VL (up to 15), which the InfiniBand Architecture specifies must each be independently buffered and flow controlled to prevent head of line blocking and flow control dead lock. In some embodiments, the InfiniBand interface contains additional flow control buffering units to transition from a WAN clock domain to an InfiniBand clock domain.

Due to physical limitations data travels at a rate slower than the speed of light over optical fiber. When the fiber is considered as a conduit that carries bits, it is clear that a single piece of long fiber may contain many megabits of data that is in transit. For instance, if the speed of light in a particular fiber carrying a 10 Gbit data stream is 5 ns/meter and the fiber is 100 km long then the fiber will contain 5 megabits of data in each direction. Many WAN paths also include added latency from in band equipment such as regeneration equipment, optical multiplexes, add/drop multiplexors, routers, switches and so on. This extra equipment adds additional latency and further extends the bandwidth latency product of the path.

As defined by the InfiniBand Architecture the InfiniBand electrical and optical signaling protocols are not compatible with, or suitable for use in, a traditional WAN environment. Typical WAN environments use the Synchronous Optical Network (SONET) standard over long distance optical fiber.

Also to ease administration of the InfiniBand network it is desirable to perform routing on InfiniBand packets, as described in the InfiniBand Architecture. Routing allows each remote distant site to maintain local control over their portion of the larger InfiniBand network without imposing substantial policy on all other participants.

SUMMARY OF THE INVENTION

When taken together, the physical limitations of fiber, the need to have buffering capacity above that of the bandwidth latency product of the path, and the feature of multiple VLs within the InfiniBand Architecture, it becomes apparent that apparatus wherein a well-managed very large buffer memory is required to extend an InfiniBand network to a transcontinental distance. For instance a physical distance of 5000 km with 15 VLs will require 894 MiB of buffer memory without considering any additional latency overheads.

Part of the function of the apparatus is to extend the credit advertised on a local short InfiniBand link, which is typically 8 KiB, to a number more suitable for a WAN, typically 512 MiB per VL. This is done using a first in first out buffer (FIFO) that empties when local InfiniBand credits are available and fills up as incoming data arrives. Periodically the apparatus notifies other remote apparatus how much space is available within the FIFO via a credit advertisement packet for each active VL and the remote apparatus use this information to ensure that it never transmits more data than the FIFO can accept. This is the same basic flow control mechanism (end-to-end credit information exchange) that is used with the InfiniBand Architecture but it is scaled up to handle gigabytes of buffer and to be more suitable for a WAN environment. In this manner, InfiniBand style flow control semantics are maintained over great distances, ensuring that no packets are discarded due to congestion.

In another embodiment, the bulk buffer memory can take packets out of the plurality of FIFO structures in an order different from the order that the packets were received.

If there is credit starvation on the local InfiniBand port then the FIFO will fill up, but due to the credit packets sent over the WAN the transmitter will stop sending before the FIFO can overflow. Credit packets may be inserted into IPv6 payload structures, or alternatively they may be embedded in IPv6 extension headers for improved efficiency.

Credit information or data is encoded in ordered sets in the 66/64 b code. InfiniBand packets can be placed within the payload structure of UDP or DCCP datagrams carried within IPv6 or IPv4 packets.

To achieve compatibility with WAN standards the InfiniBand packets are encapsulated by the apparatus within other protocols, such as IPv6 within packet over SONET (POS), for transmission over the WAN. As set forth in the IBTA, a full duplex independent transmit and receive data path is controlled by a link state machine. The InfiniBand physical link state machine can be maintained by exchanging non-Infini- Band packets across the WAN; wherein doing so establishes that an end-to-end path exists in the WAN, this exchanging of packets comprising PPP LCP (as per RFC1661) packets, Ethernet ARP (as per RFC826 and RFC2461 (IPv6 Neighbor Discovery)) exchanges, TCP session initializations (as per RFC 793), establishing ATM SVC's (as per ATM Forum Private Network Network Interface specification), or any other form of session initiation.

After being encapsulated the packets are transmitted over the WAN and the receiving apparatus performs a de-encapsulation step, removing the data added during encapsulation, thereby recovering the original InfiniBand packet.

This encapsulation serves two purposes; the first is to change the optical signaling format to something that can be natively carried over a WAN connection, such as SONET. This allows the apparatus to be directly connected to SONET optical equipment that is part of a larger SONET topology and to be carried through to a single remote destination. SONET protocols such as the Generic Framing Protocol (GFP) are designed for this kind of encapsulation task. The encapsulation component is capable of supporting a plurality of networks including any of IPv6, UDP in IPv6, DCCP in IPv6, ATM AAL5 or GFP.

This also allows the apparatus to interface with intelligent equipment within the WAN that can route individual packets or cells. This also allows the InfiniBand traffic to share the WAN infrastructure with traffic from other sources by relying on the WAN to perform aggregation, routing and/or switching of many connections.

Protocols such as ATM Adaptation Layer 5 (AAL5), IPv6 over POS and IPv6 over Ethernet are designed to allow for this.

For the purposes of establishing and maintaining an end-to-end path across the WAN, it is necessary for the communicating apparatus to exchange non-InfiniBand packets in addition to the encapsulated InfiniBand packets.

Many encapsulations are possible by the apparatus, including ATM AAL5, IPv6 over POS, IPv6 over Ethernet, DCCP in IPv6, UDP in IPv6, IPv6 over generic multi-protocol label switching (GMPLS), GFP and others. Similarly many WAN signaling standards and speeds can be supported, including SONET, Ethernet LAN-PHY and Ethernet WAN-PHY. A single apparatus may support many encapsulations and signaling standards and the user can select which to use during installation.

For shorter distances, less than 10 km, the encapsulation is forgone and simply uses optical signaling that is defined by the InfiniBand Architecture in combination with a very large flow control buffer to extend the reach of normal InfiniBand equipment while fully conforming to the InfiniBand Architecture. In this case, the encapsulation process is reduced to a null encapsulation and emits the InfiniBand packets unchanged. The number of credit blocks and/or the credit block size may be increased to extend the range beyond 10 km while still observing the otherwise unchanged InfiniBand communications protocol.

Multiple Apparatus: When the apparatus is connected to an intelligent WAN using an encapsulation protocol, which is capable of addressing, it is possible to have more than two apparatus communicate. This allows apparatus located at many physical sites to share the same WAN connection and the same apparatus while extending and linking their InfiniBand networks into a large mesh.

In this operational mode, the apparatus is required to examine each incoming local InfiniBand packet to determine which remote apparatus it should be sent to and then form the proper encapsulation to deliver it. This can be done by examining the Local Identifier (LID) within the InfiniBand packet and using the switching infrastructure defined by the InfiniBand Specification, or by examining the Global Identifier (GID) within the InfiniBand packet and routing based on a longest prefix match of the subnet prefix.

Each apparatus must also reserve a separate portion of its flow control buffer for each possible remote apparatus. This further increases the demands for buffer memory, by N–1 times, where N is the number of apparatus in the mesh.

When multicast InfiniBand packets are received, the apparatus will either map them onto a suitable WAN multicast address, or perform packet replication to send multiple copies of the packet to each remote apparatus that is subscribed to the multicast group.

As specified by the InfiniBand Architecture release 1.2, the InfiniBand routing operation requires the apparatus to translate the 128 bit IPv6 GID into a local InfiniBand path description, a 16 bit Local Identifier (LID), a 24 bit partition key and a 4 bit service level, for transmission on the local InfiniBand network using the Global Route Header (GRH).

When the apparatus is used on an intelligent network, rather than in a point-to-point configuration, the issue of quality of service within the intelligent network becomes important. The apparatus only ensures that InfiniBand packets will never be dropped due to insufficient buffering, it does not provide any guarantee that an intelligent network will not drop packets due to internal congestion or otherwise.

The primary means to minimize packet loss within the network is by the apparatus to control the injection rate of packets into the network by the apparatus. The apparatus does this by inserting delays between packets as they are sent into the WAN to the receiving unit.

The rate of injection can be either set by the user or controlled dynamically by interactions and protocols between the apparatus and the intelligent network. There are many protocols and methods for this kind of dynamic control.

The secondary approach is for the apparatus to specially tag packets so that the intelligent network can minimize the loss. This approach may be used in conjunction with injection rate control.

Management software within the Management Block of the apparatus, is responsible for running any protocols and methods that may be necessary to establish Quality of Service guarantees through the WAN network using a general purpose processor.

BRIEF DESCRIPTION OF THE DRAWINGS

FIGS. 1A through 3B are data flow diagrams that show the route packets may take within a system. Each box with square corners represents a buffer, transformational process, or a decision point. Larger round cornered boxes represent related groups of functions. Arrows show the direction of packet flow.

FIGS. 1A and 1B are a data flow diagram for a prototypical apparatus. It shows the major blocks for one embodiment of the invention.

FIGS. 2A and 2B are a data flow diagram for a specific long-range implementation designed to intemperate with a large number of WAN signaling standards and protocols. It shares many of the functional blocks outlined in FIGS. 1A and 1B.

FIGS. 3A and 3B are a data flow diagram for a specific reduced feature short-range implementation that illustrates how the InfiniBand Architecture can be used as the WAN protocol.

DETAILED DESCRIPTION OF THE PREFERRED EMBODIMENT

A person of skill in the art recognizes that various standards and resources are inherent in the conventional formulation of digital data. Some the standards and principles of operation referred to herein as being known in the art can be found with reference to:

InfiniBand Trade Association (2005). The InfiniBand Architecture release 1.2 (also known as "IBTA").

Internet Engineering Task Force (1998). RFC 2460—Internet Protocol, Version 6 (IPv6) Specification.

Internet Engineering Task Force (1989. RFC 2615—PPP over SONET/SDH.

The ATM Forum (1994). ATM User-Network Interface Specification version 3.1.

International Telecommunications Union. ITU-T Recommendation I.432.1 General Characteristics.

Open Systems Interconnection (OSI)—Basic Reference Model: The Basic Model (1994). ISO 7498-1:1994

IEEE802.3ae clause 49; 66/64b coding scheme

Figure 1A:
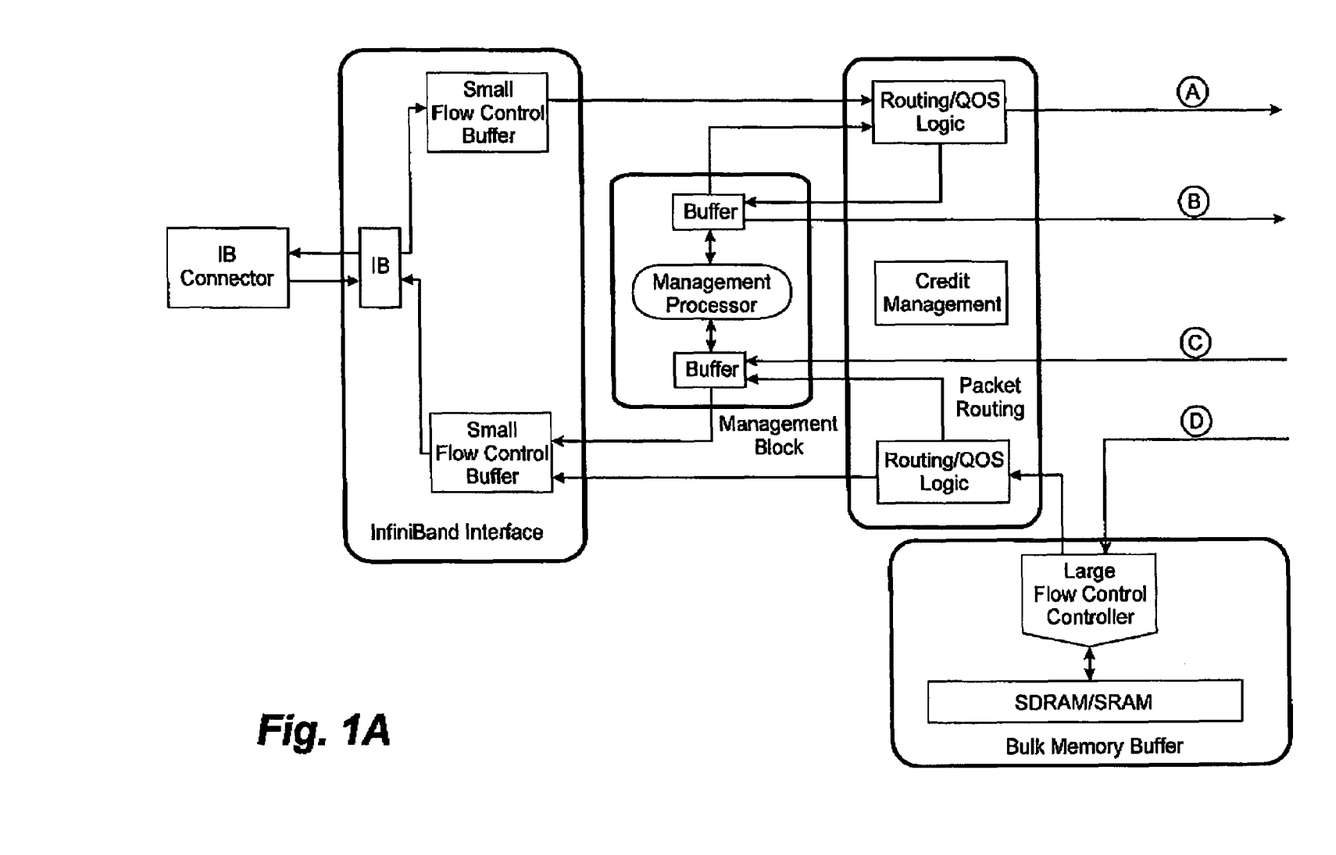
Figure 1B:
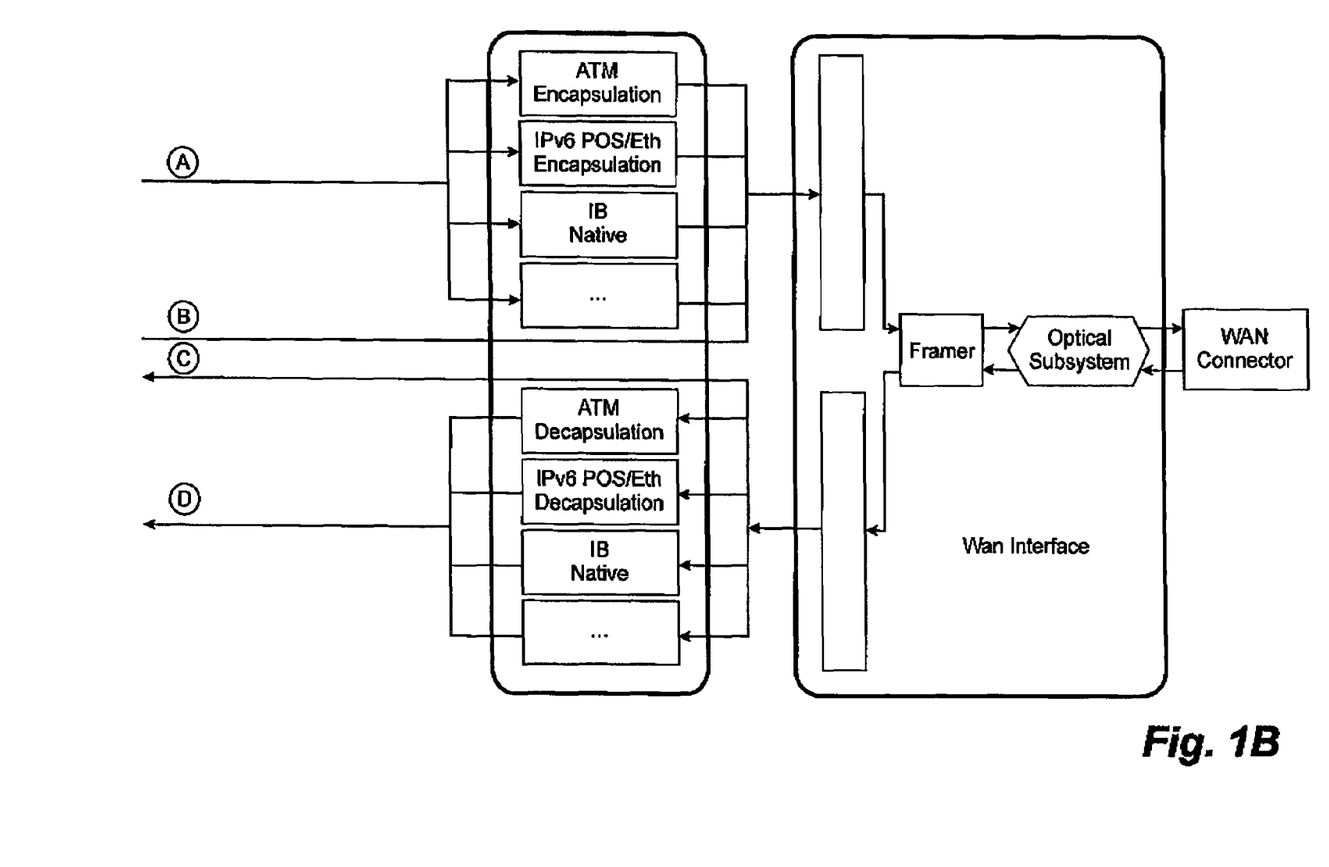

With reference to FIGS. 1A and 1B, data flow within a prototypical apparatus is described. The apparatus contains six major blocks: InfiniBand Interface, Management Block, Packet Routing, Encapsulation/De-encapsulation component (ENCAP), Wan Interface and Bulk Buffer Memory. There are a variety of techniques and technologies that can be used to implement each of these blocks. These blocks are identified as logical functions in a data flow diagram, specific implementations may choose to spread these logical functions among different physical blocks to achieve a more optimal implementation. The apparatus can maintain transfer rates of about 1 gigabyte per second of InfiniBand packets simultaneously in each direction.

The InfiniBand interface provides the LAN connection to the local IB fabric. For clarity the InfiniBand interface includes two small flow-controlling buffers to mediate the data rates from the other attached blocks.

The Management Block provides an implementation of the various high level management and control protocols that are required by the various standards the apparatus may adhere to; for instance the IB Subnet Management Agent, an implementation of the point-to-point (PPP) protocol for packet over SONET, ATM operation and maintenance cells (OAM) and neighbor discovery caching/queries for Ethernet. Typically this block will be implemented using some form of general microprocessor combined with specialized logic for any low latency or high frequency management packets, such as some kinds of OAM cells.

The Packet Routing block implements the functionality required by the multiple apparatus InfiniBand routing, and Quality of Service (QOS) capabilities described above. It also provides the WAN credit packets as discussed in the context of distance extension. The Packet Routing block is also able to identify packets that should be delivered to the Management Block for special processing.

The Encapsulation/De-encapsulation block implements the encapsulation process discussed in the context of protocol encapsulation above. On one embodiment, the protocol is an OSI 7 Layer reference model (as defined in ISO 7498-1:1994) and is selected from the group consisting of layer 1 (physical), layer 2 (data link), layer 3 (network) and layer 4 (transport).

The prototypical diagram shows several possible different schemes. The Encapsulation block relies on additional data from the Routing Block to determine the exact form of encapsulation. De-Encapsulation restores the original IB packet from the encapsulated data. Some packets may be routed to the Management Block and not sent through the De-Encapsulation block if they are identified as management packets.

The WAN interface is a generic interface to the WAN port. As shown here it includes an optical subsystem, but WAN interfaces are possible that use electrical signaling. A framer unit or function takes the packet data from the Encapsulation block and formats it to comply with the chosen WAN protocol. For instance, the Ethernet specifications would refer to the framer as a combination of the Media Access Controller (MAC) the physical coding sub-layer (PCS) and the physical media attachment (PMA). The framer also performs the inverse, and extracts the packet from the WAN interface to be passed to the de-encapsulation block.

Supported framing formats include SONET/SDH, 10 GBASE-R, InfiniBand, 10 GBASE-W and the 66/64 b coding scheme defined by IEEE802.3ae clause 49-10 GBASE-R.

The Bulk Buffer Memory implements the Credit Management unit as per the description of distance extension. The exact nature of the underlying memory can vary depending on the implementation.

Figure 2A:
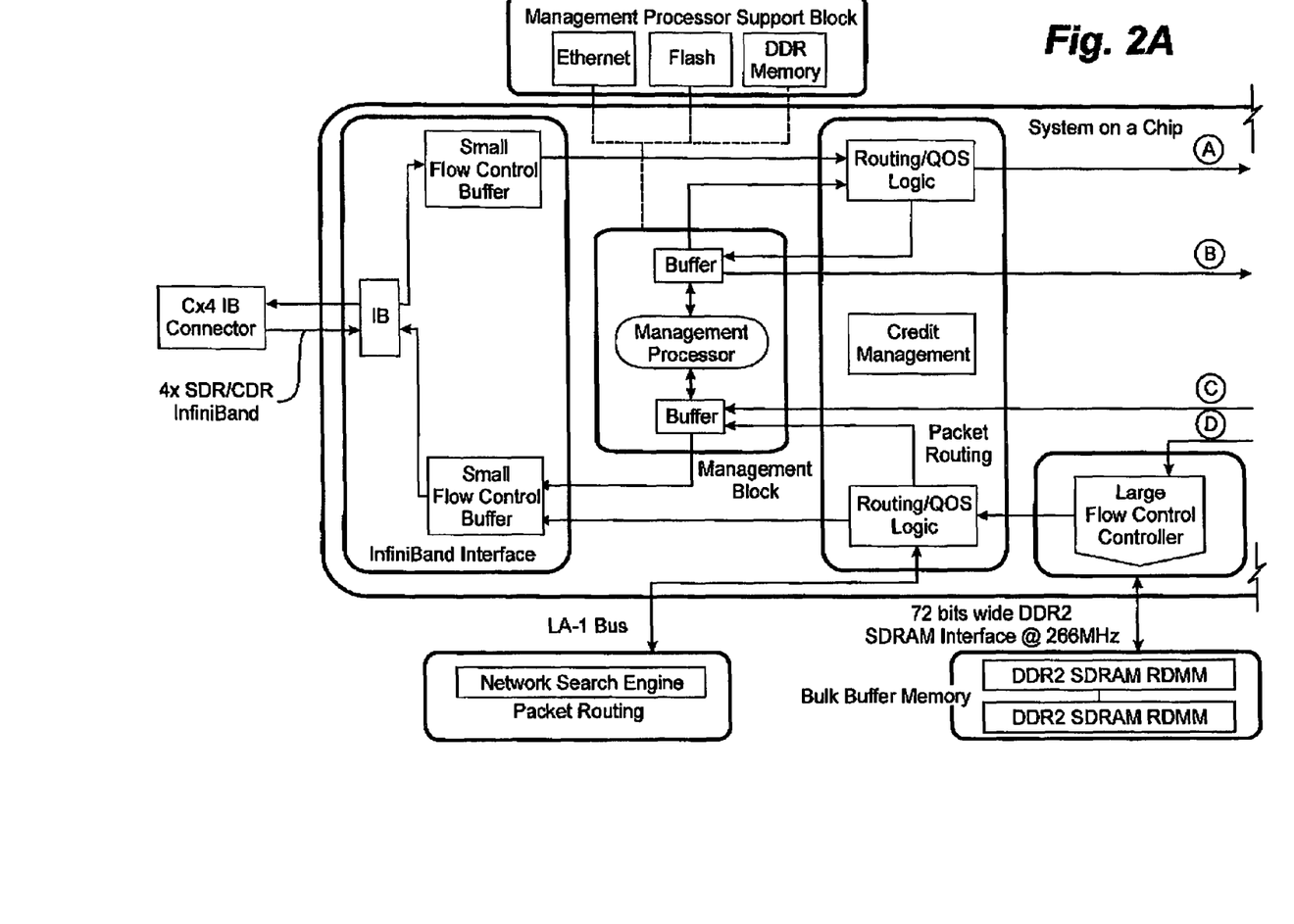
Figure 2B:
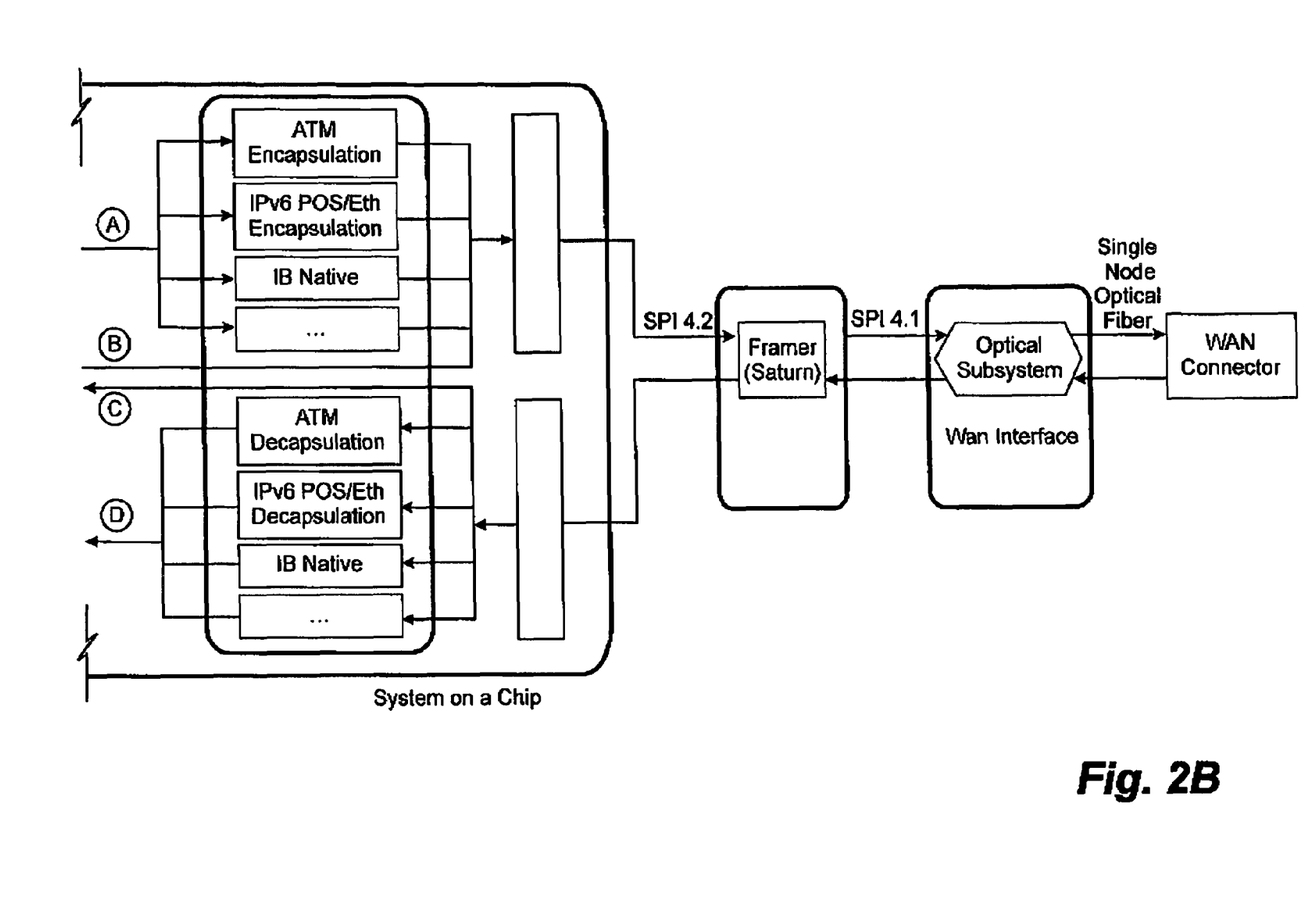

FIGS. 2A and 2B, describe the data flow within the preferred embodiment for a long-range configuration of the Invention. This embodiment of the invention consists of a Printed Circuit Board (PCB) assembly that contains a System on a Chip implemented within a Field Programmable Gate Array (FPGA), a CX4 copper 4×InfiniBand connector, a SONET/Ethernet framer/mapper, 2 slots of registered double data rate 2 (DDR2) synchronous dynamic random access memory (SDRAM), a network search engine, management processor support elements and an interchangeable WAN optical module that conforms to the MSA-300 specification.

The FPGA provides the unique functionality for the apparatus, while the rest of the components are industry standard parts. The FPGA implements four electrical interfaces for the main data path, 2.5 Gbit 4× InfiniBand—connected to the CX4 connector, 266 MHz DDR2 SDRAM—used for the FIFOs, SPI-4.2—to connect to the framer/mapper and LA-1—connected to the network search engine.

The FIFO buffer is implemented using standard DDR2 SDRAM. By time division multiplexing access to the memory to provide an effective dual ported RAM with a maximum ingress bandwidth above 10 Gbit/sec, while simultaneously maintaining an egress bandwidth above 10 Gbit/sec. This allows inexpensive commodity memory to be used for the FIFO buffer. Control logic within the FPGA partitions the SDRAM into multiple VLs and operates the SDRAM memory bus to provide the FIFO functionality.

Access to the WAN is provided using components that follow the specifications defined by the Optical Internetworking Forum (OIF). Specifically, a SFI-4.1 interface is used to connect to an optical module over a connector defined by the MSA-300 specification. This same interface can also be converted on the fly to an IEEE 802.3ae XSBI interface for use with 10 G Ethernet LAN PHY. The interchangeable module allows the apparatus to support OC-192 SONET, 10 G Ethernet LAN PHY and 10 G Ethernet LAN PHY, on several kinds of fiber with different launch powers and receiver sensitivities, depending on the user requirement and optical module installed.

The apparatus may communicate directly across an optical WAN, or indirectly via additional standard networking equipment such as SONET/SDH multiplexers, optical regenerators, packet routers and cell switches.

The SFI-4.1/XSBI interface is connected to the framer/mapper, which internally handles aspects the low level signaling protocol (MAC/PCS/PMA functions in Ethernet parlance). The FPGA communicates entire packets (or cells in the ATM case) with the framer/mapper over a SPI-4.2 interface, which the framer/mapper then transforms into the desired WAN signaling protocol. This transformation is governed by standards published by the International Telecommunications Union (ITU), the Internet Engineering Task Force (IETF), the ATM Forum, the Institute of Electrical and Electronic Engineers (IEEE) and the Optical Internetworking Forum (OIF).

The final component is the LA-1 connected network search engine (NSE). The NSE is used as part of the InfiniBand routing feature to translate incoming IPv6 addresses to local InfiniBand path descriptions. The FPGA will extract the IPv6 packet from the packet arriving from the WAN and pass it to the NSE, which will then rapidly search internal tables to find a match, and will then return the associated data (the matching IB path) to the FPGA. As necessary the management processor within the FPGA will update the NSE tables with new data as it becomes available.

Figure 3A:
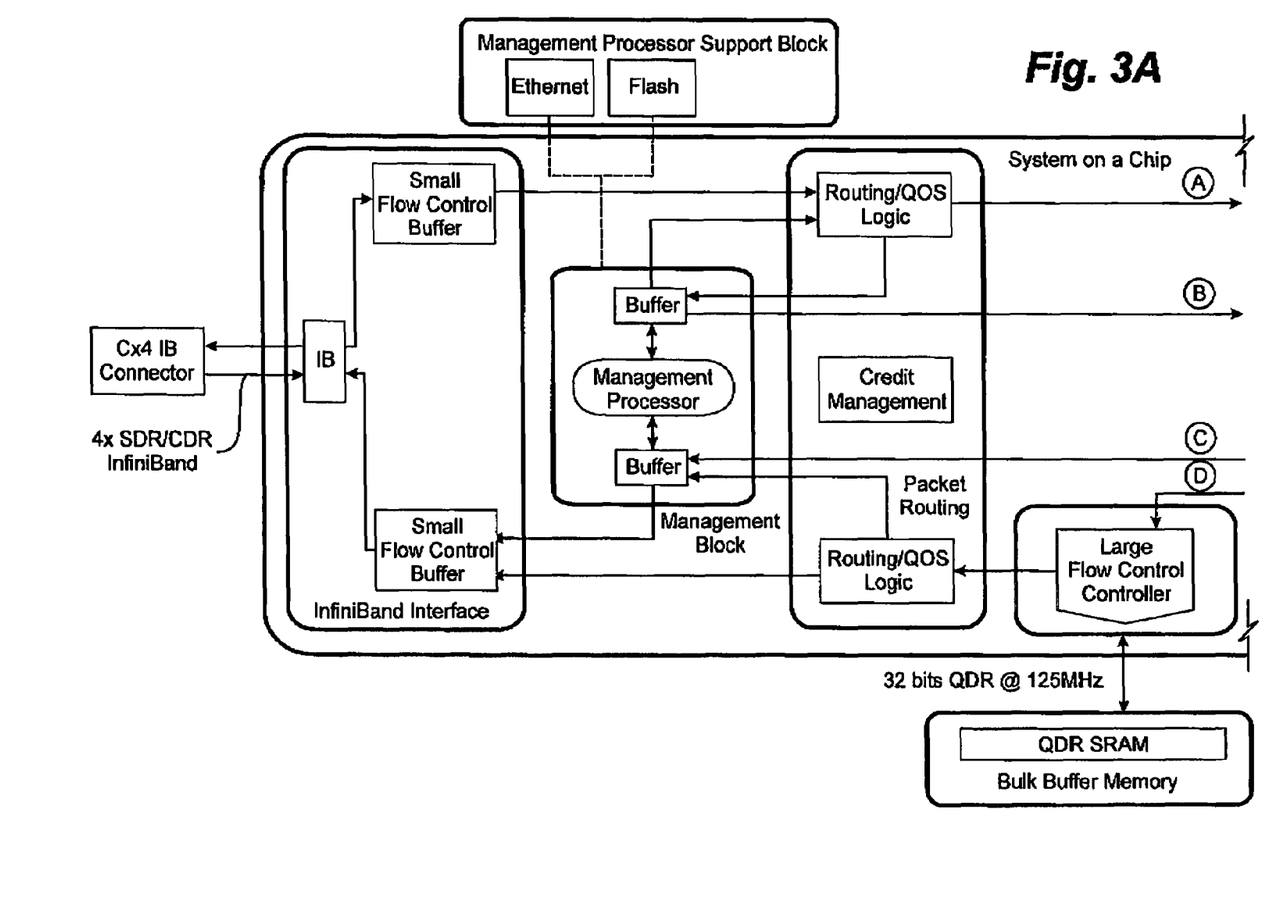
Figure 3B:
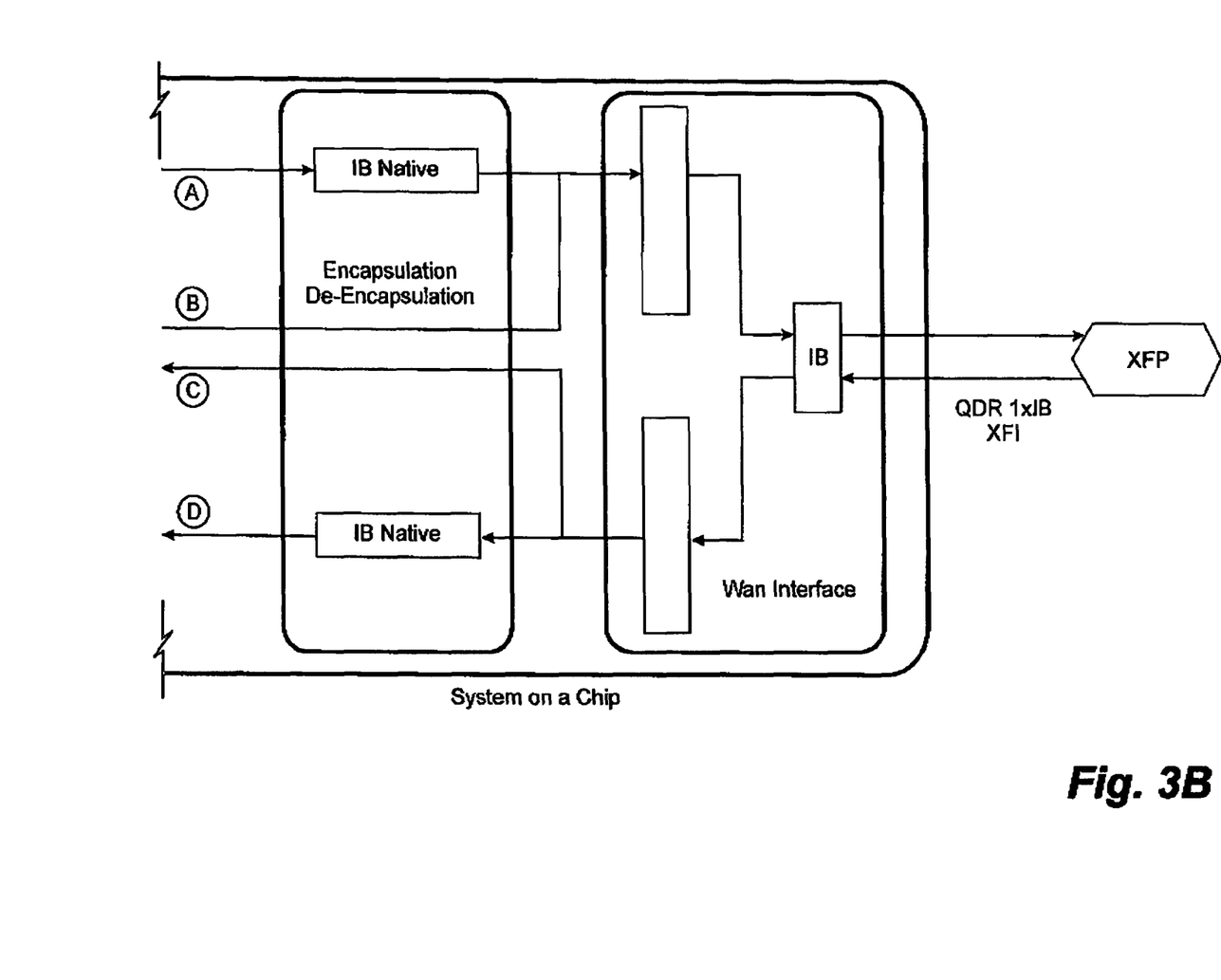

A second embodiment of the invention is shown in FIGS. 3A and 3B. This embodiment is a cost reduced version of the same prototypical apparatus shown in FIGS. 2A and 2B. The main goal of this implementation is to allow for distance extension up to 10 km using only quad data rate (QDR) 1× InfiniBand, as defined by the InfiniBand Architecture.

This implementation consists of a FPGA, a CX4 connector, a single chip of QDR SRAM and an XFP optical module. The FPGA directly interfaces with both 10 Gbit 4× InfiniBand (Local) and 10 Gbit 1× InfiniBand (WAN).

Like in the long-range embodiment an interchangeable module provides the optical WAN interface. However, instead of an MSA-300 interface, this module conforms to the XFP specification (as defined by the XFP MSA Group) and communicates directly with the FPGA over a 10 Gbit XFI bus. This allows the user to select an XFP module that best suites their local environment.

The FIFO buffer is implemented using QDR (or QDR2) SRAM, which are forms of memory that are optimally designed for small dual ported memory. A controller in the FPGA partitions the memory into multiple VLs and managed operations of the FIFOs.

The embodiments of the invention for which we claim and exclusive property or privilege are defined as follows:

1. A method carrying InfiniBand (IB) packets over a long distance connection, comprising:
   receiving IB packets from a first IB interface over a first link state;
   encapsulating the received IB packets within a long distance protocol in an encapsulation unit connected to the first IB interface;
   transmitting the encapsulated IB packets over the long distance connection (WAN);
   receiving the encapsulated IB packets at a de-encapsulation unit;
   de-encapsulating the received IB packets in the de-encapsulation unit by removing the encapsulation and recovering the IB packets;
   buffering the recovered IB packets in a bulk buffer memory that exceeds 128 KiB;
   delivering the recovered IB packets to a second interface over a second link state;
   regulating the flow of IB packets over the WAN by a credit management unit so that no packets are discarded by the receiving bulk buffer memory due to insufficient capacity; and
   maintaining an IB physical link state machine and IB style flow control over the WAN to distances greater than about 10 km, the IB physical link state machine and IB style flow control being maintained between the encapsulation unit, the WAN, the de-encapsulation unit, the bulk buffer memory and the credit management unit.

2. The method of claim 1 wherein the protocol is an OSI 7 Layer reference model and is selected from the group consisting of layer 1, layer 2, layer 3 and layer 4.

3. The method of claim 1, wherein transmitting encapsulated IB packets further comprises extending an IB link distance over the WAN to distances greater than about 100 km.

4. The method of claim 3 wherein increasing the link distance further comprises increasing IB credit advertised on the link beyond about 128 KiB per-virtual lane (VL).

5. The method of claim 4 wherein increasing the IB credit comprises increasing the number of bytes per advertised credit block.

6. The method of claim 4 wherein increasing the IB credit comprises increasing the number of credit blocks per advertisement.

7. The method of claim 4 wherein increasing the IB credit comprises both increasing the number of credit blocks and the number of bytes per block in each advertisement.

8. The method of claim 1 wherein maintaining the IB style flow control comprises the first IB interface choosing an egress virtual lane (VL) at the second IB interface for the de-encapsulated IB packets.

9. The method of claim 1, wherein maintaining the IB physical link state machine further comprises exchanging non-IB packets across the WAN; wherein doing so establishes that an end-to-end path exists in the WAN, the exchanging of packets being selected from the group consisting of PPP LCP packets, Ethernet ARP exchanges, TCP session initializations, and establishing ATM SVC's.

10. The method of claim 1 wherein maintaining IB style flow control further comprises buffering packets received on the WAN in the buffer memory.

11. An apparatus for carrying InfiniBand (IB) packets consisting of logic circuits, comprising:
   a first IB interface, a WAN interface, a second interface;
   the first IB interface coupled to an InfiniBand routing and QOS component;
   the IB routing and QOS coupled to an encapsulation component;
   the encapsulation component coupled to the WAN interface;
   the WAN interface further coupled to a de-encapsulation component;
   the de-encapsulation component coupled to a bulk buffer memory that exceeds 128 KiB;
   the bulk buffer memory coupled to the second IB interface;
   a credit management unit generates credits for the WAN and produces back pressure onto the first and second IB interfaces;
   the bulk buffer memory, the encapsulating and the de-encapsulating components are coupled to the credit management unit for encapsulating and de-encapsulating credit information; and
   a management block provides an IB Subnet Management Agent, WAN end-to-end negotiation and management services wherein:
   a first link state is maintained at the first IB interface; a second independent IB link state and IB style flow control is maintained over the WAN interface to distances greater than about 10 km, the IB link state and the IB style flow control being maintained between the IB routing and QOS block, the encapsulation component, the WAN interface, the de-encapsulation component, the bulk buffer memory, the credit management unit and the management block; and a third link state is maintained at the second IB interface.

12. The apparatus of claim 11 wherein the apparatus can maintain transfer rates of about 1 gigabyte per second of IB packets simultaneously in each direction.

13. The apparatus of claim 11, wherein the first and Second IB interfaces contains additional flow control buffering units to transition from a WAN clock domain to an IB clock domain.

14. The apparatus of claim 11 wherein the encapsulation/de-encapsulation component supports a plurality of networks including any of IPv6, UDP in IPv6, DCCP in IPv6, ATM AAL5 or GFP.

15. The apparatus of claim 11 wherein the WAN interface further comprises:
a framer unit supporting a plurality of network formats, including any of SONET/SDH, 10 GBASE-R, InfiniBand and 10 GBASE-W; and
an optical subsystem capable of supporting any of SONET/SDH, 10 GBASE-R, or IB.

16. The apparatus of claim 15 wherein the optical subsystem is further capable of reaching reaches distances greater than specified by IBTA IB Architecture Release 1.2, alone or when coupled with other equipment such as SONET/SDH multiplexers, optical regenerators, packet routers or cell swit6hes.

17. The apparatus of claim 11 wherein the bulk buffer memory Can take packets out of a plurality of FIFO structures in an order different from the order that the packets were received.

18. The apparatus of claim 11 wherein the credit management unit advertises more credits than defined by the IB specification through increasing the credit block size and/or increasing the number of blocks per advertisement.

19. The apparatus of claim 11 wherein the management block of claim 11 further comprises:
a general purpose processor; and
a mechanism to send and receive packets on both the WAN and the first and second IB interfaces.

20. The apparatus of claim 11 wherein the bulk buffer memory further comprises:
a plurality of DDR2 memory modules (DIMMS);
wherein control logic maintains a plurality of FIFO structures within the DDR2 memory; and
wherein each FIFO structure is used to buffer a WAN to IB virtual lane (VL); and wherein the packet flow out of the memory is regulated to ensure that no packets are discarded due to congestion at the first and second IB interfaces.

21. The apparatus of claim 11 for maintaining a maximum transfer rate of 1 gigabyte per second of IB packets simultaneously in each direction, further comprising:
additional flow control buffering units to transition from a WAN clock domain to an IB clock domain;
wherein the encapsulation/de-encapsulation component supports a plurality of networks including any of IPv6, UDP in IPv6, DCCP in IPv6, ATM Adaptation Layer 5 (AAL5) or Generic framing Protocol (GFP);
a framer unit supporting a plurality of network formats, including any of SONET/SDH, 10 GBASE-R, IB and 10 GBASE-W;
an optical subsystem coupled capable of supporting any of SONET/SDH, 10 GBASE-R, or IB wherein the optical subsystem reaches distances greater than specified by IBTA IB Architecture Release 1.2;

wherein the bulk buffer memory bulk buffer memory can take packets out of the plurality of FIFO structures in an order different from the order that the packets were received and wherein the bulk buffer memory further comprises:
a plurality of DDR2 memory modules (DIMMS);
wherein control logic maintains a plurality of FIFO structures within the DDR2 memory; and wherein each FIFO structure is used to buffer a WAN to IB virtual lane; and
wherein the packet flow out of the memory is regulated to ensure that no packets are discarded due to congestion at the first and second IB interfaces,
wherein the credit management advertises more credits than defined by the IB specification;
wherein the management block further comprises:
a general purpose processor; and
a mechanism to send and receive packets on both the WAN and the first and second IB interfaces.

22. The apparatus of claim 11 wherein the encapsulation/de-encapsulation component performs a null encapsulation and emits the IB packets unchanged.

23. The apparatus of claim 11 wherein, the bulk buffer memory further comprises:
a plurality of SRAM memory chips;
wherein control logic maintains a plurality of FIFO structures within the SRAM memory chips; and
wherein each FIFO structure is used to buffer a WAN to IB VL; and
wherein the packet flow out of the memory is regulated to ensure that no packets are discarded due to congestion at the first and second IB interfaces.

24. The apparatus of claim 23 wherein the SRAM memory chips are QDR2 SRAM.

25. The apparatus of claim 21, wherein the bulk buffer memory comprise a plurality of SRAM memory chips; and
wherein control logic maintains a plurality of FIFO structures within the SRAM memory chips; and
wherein each FIFO structure is used to buffer a WAN to IB VL; and
wherein the packet flow out of the memory is regulated to ensure that no packets are discarded due to congestion at the first and second IB interfaces.

26. The apparatus of claim 21 wherein the IB packets are placed within the payload structure of IPv6 packets.

27. The apparatus of claim 21 wherein the credit data is encoded in extension headers within the IPv6 header.

28. The apparatus of claim 21
wherein the encapsulation/de-encapsulation, component frames the IB packets in a manner that is compatible with the 66/64b coding scheme defined by IEEE802.3ae clause 49; and
wherein the encapsulation/de-encapsulation component can remove the clause 49 compatible framing and recover the original IB packet.

29. The apparatus of claim 21 wherein the credit information is encoded in ordered sets in the 66/64b code.

30. The apparatus of claim 21 wherein the IB packets are placed within the payload structure of UDP or DCCP datagrams carried within IPv6 or IPv4 packets.

31. The apparatus of claim 21 wherein the IB packets are segmented into ATM Cells according to the ATM AAL5.

32. The apparatus of claim 11 wherein the IB packets are placed within the payload structure of a GFP packet and placed within a SONET/SDH frame.

33. The apparatus of claim 21 wherein the credit data is encoded in the payload structure of the encapsulation.

34. A system, comprising:
a first InfiniBand (IB) fabric coupled over a first link state to a first IB interface;
a second IB fabric coupled over a second link state to a second interface;
the first and second IB interfaces being coupled through:
a first logic circuitry to encapsulate and de-encapsulate IB packets into a long distance network protocol; and
a second logic circuitry including a bulk buffer memory that exceeds 128 KiB to buffer the IB packets;
a long distance network interface that carries the encapsulated IB packets; and
an independent IB link state and IB style flow control maintained over the long distance network interface to distances greater than about 10 km, the IB link state and IB style flow control being maintained between the first and second logic circuitry and the long distance network interface.

35. The system of claim 34 wherein the first IB interface and second IB interface are further indirectly coupled over an extended WAN network, the extended WAN network comprising one or more of SONET/SDH multiplexers, optical regenerators, packet routers, and cell switches.

36. The system of claim 34 wherein the flow rate of IB packets into the first logic circuitry may be limited by the first and second IB interfaces based upon conditions within the network or administrative configuration to a rate less than or equal to the maximum rate possible.

37. The system of claim 34 wherein the system further comprises: a packet or cell switched or routed network existing between the first and second IB interfaces;
wherein more than two IB interfaces can be connected to this network; and
wherein each end IB interface can encapsulate and address packets to more than one destination-IB interface.

38. The system of claim 34 further comprising
an apparatus for carrying InfiniBand (IB) packets consisting of logic circuits and maintaining a maximum transfer rate of 1 gigabyte per second of IB packets simultaneously in each direction, comprising:
a first IB interface, a WAN interface, a second interface;
the first IB interface coupled to an InfiniBand routing and QOS component;
the IB routing and QOS coupled to an encapsulation component;
the encapsulation component coupled to the WAN interface;
the WAN interface further coupled to a de-encapsulation component;
the de-encapsulation component coupled to a bulk buffer memory that exceeds 128 KiB;
the bulk buffer memory coupled to the second IB interface;
a credit management unit generates credits for the WAN and produces back pressure onto the first and second IB interfaces;
the bulk buffer memory, the encapsulating and the de-encapsulating components are coupled to the credit management unit for encapsulating and de-encapsulating credit information; and
a management block provides an IB Subnet Management Agent, WAN end-to-end negotiation and management services wherein:
a first link state is maintained at the first IB interface; a second independent IB link state and IB style flow control is maintained over the WAN interface to distances greater than about 10 km, the IB link state and the IB style flow control being maintained between the IB routing and QOS block, the encapsulation component, the WAN interface, the de-encapsulation component, the bulk buffer memory, the credit management unit and the management block; and a third link state is maintained at the second IB interface;
additional flow control buffering units to transition from a WAN clock domain to an IB clock domain;
wherein the encapsulation/de-encapsulation component supports a plurality of networks including any of IPv6, UDP in IPv6, DCCP in IPv6, ATM Adaptation Layer 5 (AAL5) or Generic framing Protocol (GFP);
a framer unit supporting a plurality of network formats, including any of SONET/SDH, 10 GBASE-R, IB and 10 GBASE-W;
an optical subsystem coupled capable of supporting any of SONET/SDH, 10 GBASE-R, or IB wherein the optical subsystem reaches distances greater than specified by IBTA IB Architecture Release 1.2;
wherein the bulk buffer memory bulk buffer memory can take packets out of the plurality of FIFO structures in an order different from the order that the packets were received and wherein the bulk buffer memory further comprises:
a plurality of DDR2 memory modules (DIMMS)
wherein control logic maintains a plurality of FIFO structures within the DDR2 memory: and wherein each FIFO structure is used to buffer a WAN to IB virtual lane; and
wherein the packet flow out of the memory is regulated to ensure that no packets are discarded due to congestion at the first and second IB interfaces,
wherein the credit management advertises more credits than defined by the IB specification;
wherein the management block further comprises:
a general purpose processor; and
a mechanism to send and receive packets on both the WAN and the first and second IB interfaces.

39. The system of claim 34 further comprising
an apparatus for carrying InfiniBand (IB) packets consisting of logic circuits and maintaining a maximum transfer rate of 1 gigabyte per second of IB packets simultaneously in each direction, comprising:
a first IB interface, a WAN interface, a second interface;
the first IB interface coupled to an InfiniBand routing and QOS component;
the IB routing and QOS coupled to an encapsulation component;
the encapsulation component coupled to the WAN interface;
the WAN interface further coupled to a de-encapsulation component;
the de-encapsulation component coupled to a bulk buffer memory that exceeds 128 KiB;
the bulk buffer memory coupled to the second IB interface;
a credit management unit generates credits for the WAN and produces back pressure onto the first and second IB interfaces;
the bulk buffer memory, the encapsulating and the de-encapsulating components are coupled to the credit management unit for encapsulating and de-encapsulating credit information; and
a management block provides an IB Subnet Management Agent, WAN end-to-end negotiation and management services wherein:
a first link state is maintained at the first IB interface; a second independent IB link state and IB style flow control is maintained over the WAN interface to distances greater than about 10 km, the IB link state and the IB style flow control being maintained between the IB routing and QOS block, the encapsulation component, the WAN interface, the de-encapsulation component, the bulk buffer memory, the credit management unit and the management block; and a third link state is maintained at the second IB interface;

additional flow control buffering units to transition from a WAN clock domain to an IB clock domain;

wherein the encapsulation/de-encapsulation component supports a plurality of networks including any of IPv6, UDP in IPv6, DCCP in IPv6 ATM Adaptation Layer 5 (AAL5) or Generic framing Protocol (GFP);

a framer unit supporting a plurality of network formats, including any of SONET/SDH, 10 GBASE-R, IB and 10 GBASE-W;

an optical subsystem coupled capable of supporting any of SONET/SDH, 10 GBASE-R, or IB wherein the optical subsystem reaches distances greater than specified by IBTA IB Architecture Release 1.2;

wherein the bulk buffer memory bulk buffer memory can take packets out of the plurality of FIFO structures in an order different from the order that the packets were received and wherein the bulk buffer memory further comprises:

a plurality of DDR2 memory modules (DIMMS);

wherein control logic maintains a plurality of FIFO structures within the DDR2 memory; and wherein each FIFO structure is used to buffer a WAN to IB virtual lane; and wherein the packet flow out of the memory is regulated to ensure that no packets are discarded due to congestion at the first and second IB interfaces, wherein the credit management advertises more credits than defined by the IB specification;

wherein the management block further comprises:

a general purpose processor; and a mechanism to send and receive packets on both the WAN and the first and second IB interfaces;

wherein the bulk buffer memory comprise a plurality of SRAM memory chips; and wherein control logic maintains a plurality of FIFO structures within the SRAM memory chips; and wherein each FIFO structure is used to buffer a WAN to IB VL; and wherein the packet flow out of the memory is regulated to ensure that no packets are discarded due to congestion at the first and second IB interfaces.

40. The system of claim 34 further comprising:

two IB fabrics having disjoined local identifier (LID) address spaces and different subnet prefixes;

a packet routing component integrated into the IB interfaces devices wherein:

logic circuitry determines the LID address of a given IB packet by examining the destination global identifier (GID) in the global route header (GRH); and wherein logic circuitry can replace the LID, service level (SL), virtual lane (VL) or other components of the IB packet using information from the GRH.

41. The apparatus of claim 15 wherein the optical subsystem is further capable of reaching distances greater than specified by IBTA IB Architecture Release when coupled with switching devices.

42. The apparatus of claim 41 wherein the switching devices are selected from the group consisting of SONET/SDH multiplexers, optical regenerators, packet routers and cell switches.

43. An apparatus for carrying IB packets consisting of logic circuits, comprising a first apparatus of claim 11 and a second apparatus of claim 11 wherein the encapsulation component of the first apparatus is coupled to the de-encapsulation component of the second apparatus.

* * * * *